R. C. SAYER.
SANITARY FLUSHING APPARATUS.
APPLICATION FILED APR. 18, 1913.
1,161,736.
Patented Nov. 23, 1915.
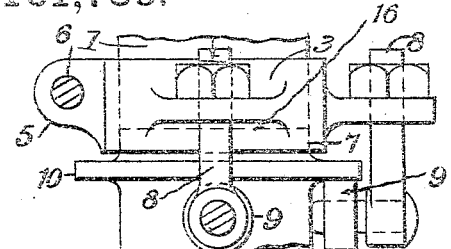
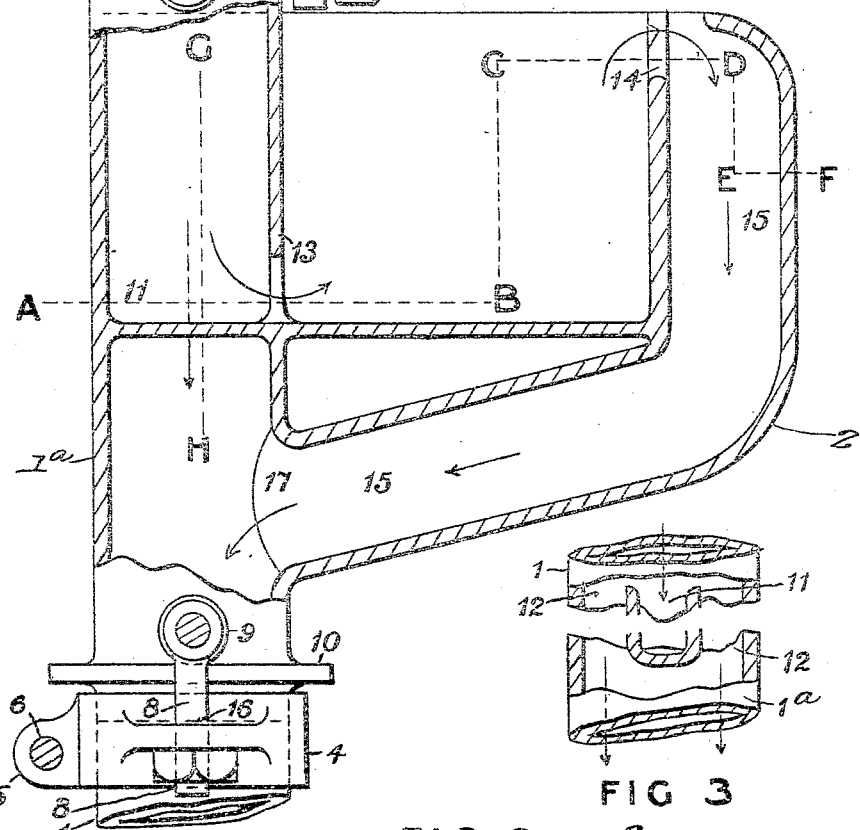
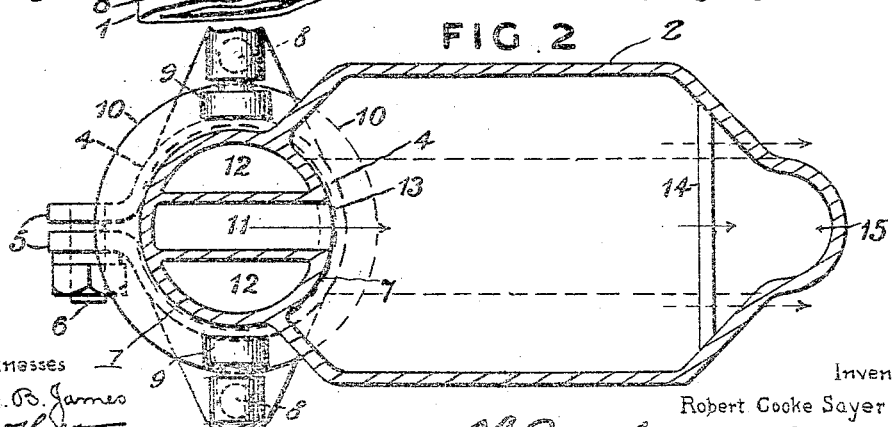
Witnesses
E. B. James
L. Halton
Inventor
Robert Cooke Sayer
by H. B. Willson & Co.
Attorneys

UNITED STATES PATENT OFFICE.

ROBERT COOKE SAYER, OF BRISTOL, ENGLAND.

SANITARY FLUSHING APPARATUS.

1,161,736.  Specification of Letters Patent.  Patented Nov. 23, 1915.

Application filed April 18, 1913. Serial No. 762,090.

*To all whom it may concern:*

Be it known that I, ROBERT COOKE SAYER, a subject of the King of Great Britain and Ireland, residing at 11 Clyde road, Redland, Bristol, in the county of Gloucester, England, have invented certain new and useful Improvements in Sanitary Flushing Apparatus, of which the following is a specification.

The object is to provide a vessel, or basin, which is automatically and continuously supplied with water, and kept clean by flushing out when used for flushing or other purposes.

It essentially consists of inserting into a flushing pipe, or the like an open or closed vessel, with a trap in the pipe by which to catch any proportion of its flushing water having a bridge to prevent splashing as it enters the vessel, a weir or overflow from the vessel leading to the flushing pipe below it, so that the diverted water shall not be lost for flushing when required; fixing the vessel so as to swivel around the flushing pipe to any angle, by rings clamped to the flushing pipe, and screw-bolts to draw the ends of the flushing pipe, with the vessel between them together on friction rollers to make tight joints while swiveling.

The invention is shown in detail by the following specification and accompanying drawing, where—

Figure 1 is a sectional elevation of the apparatus, Fig. 2 a sectional plan at A—B; C—D; E—F, Fig. 1, Fig. 3 a section in two parts at G—H, Fig. 1.

In the accompanying drawing, a flushing pipe 1 is shown with a vessel 2 and its parts secured to it by rings 3 and 4 having flanges 5 firmly clamped by bolts 6 but sufficiently free at 7 to allow the vessel 2 to swivel by friction wheels 9 running on flanges 10 on the pipe part of the vessel 2 and obtain water tight joints 16 by screwing up the parts by screw bolts 8.

As shown the vessel 2 is formed integrally with a vertical tubular or pipe-like part $1^a$ which is coupled into the flushing pipe 1 in the manner described. This vertical tubular part $1^a$ on the vessel 2 is divided by suitable partitions to form a central compartment or trap 11 between side passages 12. The trap or compartment 11 is arranged to intersect a portion of the water passing down the flushing pipe 1 and divert it into the vessel 2 under a bridge or apertured wall 13. Any desired proportion of the flushing water may be diverted in this way, but preferably the quantity is sufficient to normally fill the vessel 2. From this vessel a weir or overflow 14 communicates through a downwardly inclined pipe 15 with the tubular part $1^a$ at 17 so that at each flushing operation the vessel 2 is filled afresh, while the water previously contained in it, whether made dirty by washing anything in it or not, is flushed out and passes through the pipe 15 into the tube $1^a$ and thence into the flushing pipe 1.

The pipe 1 may be a rain or other fluid carrying pipe to conduct the water to drains or elsewhere or to a storage reservoir.

Claims:

The combination with a vertically disposed pipe, of a vessel, a tubular part on the vessel communicating with the vertical pipe, flanges on said tubular part, clamping rings secured to said pipe, screw bolts carried by said rings and friction rollers carried by said bolts and engaging said flanges, whereby said vessel is revolubly connected to said pipe to permit said vessel to swivel laterally, a trap in said tubular part adapted to receive water from the said vertical pipe and divert it into the vessel to fill the vessel, means for returning the overflow from the vessel to the vertical pipe, the whole constructed and operating to produce an automatic supply of fresh water to the vessel by flushing it whenever there is a flow through the vertical pipe irrespective of the position of the vessel.

In testimony whereof I have affixed my signature in presence of two witnesses.

ROBERT COOKE SAYER.

Witnesses:
E. J. FUSSELL,
E. TYLER.